US012476101B1

(12) United States Patent
Maldonado et al.

(10) Patent No.: US 12,476,101 B1
(45) Date of Patent: Nov. 18, 2025

(54) ULTRA-COMPACT ION MASS SPECTROMETER FOR SPACE AND LABORATORY PLASMA MEASUREMENTS

(71) Applicant: Triad National Security, LLC, Los Alamos, NM (US)

(72) Inventors: Carlos Alex Maldonado, Los Alamos, NM (US); Daniel Brett Reisenfeld, Los Alamos, NM (US); Gabriel Renner Wilson, Los Alamos, NM (US); Heidi Linette Morning, Los Alamos, NM (US); Daniel Wayne Arnold, Los Alamos, NM (US); Michael Andrew Holloway, Los Alamos, NM (US); Justin Michael McGlown, Los Alamos, NM (US)

(73) Assignee: Triad National Security, LLC, Los Alamos, TX (US)

( * ) Notice: Subject to any disclaimer, the term of this patent is extended or adjusted under 35 U.S.C. 154(b) by 319 days.

(21) Appl. No.: 18/357,872

(22) Filed: Jul. 24, 2023

Related U.S. Application Data

(60) Provisional application No. 63/396,175, filed on Aug. 8, 2022.

(51) Int. Cl.
*H01J 49/28* (2006.01)

(52) U.S. Cl.
CPC .................................. *H01J 49/284* (2013.01)

(58) Field of Classification Search
USPC .......................................................... 250/294
See application file for complete search history.

(56) References Cited

U.S. PATENT DOCUMENTS

2003/0193021 A1* 10/2003 Berger .................... H04L 67/10
250/299
2022/0293407 A1* 9/2022 Hoang .................. H01J 49/025

OTHER PUBLICATIONS

A. Glocer et al., "Modeling ionospheric outflows and their impact on the magnetosphere, initial results," Journal of Geophysical Research, 114(A05216):1-16, (2009).

A. L. Vampola et al., "CRRES Magnetic Electron Spectrometer AFGL-701-5A(MEA)," Journal of Spacecraft and Rockets, 29(4):592-595, (1992).

A. W. Yau et al., "Sources of Ion Outflow in the High Latitude Ionosphere," Space Science Review, 80:1-25, (1997).

C. A. Maldonado et al., "A laminated energetic electrostatic analyzer for 0-5 keV charged particles," Rev. Sci. Instrum., 91:013303, (2020).

C. J. Pollock et al., "Medium Energy Neutral Atom (MENA) Imager for the Image Mission," Space Sci. Rev., 91(1-2):113-154, (2000).

(Continued)

*Primary Examiner* — Kiet T Nguyen
(74) *Attorney, Agent, or Firm* — ALSTON & BIRD LLP

(57) ABSTRACT

Embodiments provide for an ion mass spectrometer. An example ion mass spectrometer includes a laminated collimator, a laminated electrostatic analyzer (ESA) positioned downstream from the laminated collimator, a magnetic sensor analyzer positioned downstream from the laminated ESA, and a position sensitive cross-delay anode (XDL) assembly having a micro-channel plate (MCP) and a cross delay-line (XDL) anode.

26 Claims, 6 Drawing Sheets

OFFICIAL USE ONLY/EXPORT CONTROLLED INFORMATION

(56) References Cited

OTHER PUBLICATIONS

C. Maldonado et al., "Undergraduate Research and Science Mission Opportunities with Microtechnology Enabled Particle Detectors," Proc. SPIE 10982, Micro- and Nanotechnology Sensors, Systems, and Applications XI, 1098201, 10982:1098201, (2019).
C. R. Chappell et al., "The retarding ion mass spectrometer on dynamics Explorer-A," NASA-TM-82418, 26 pages, (1981).
C. W. Carlson et al., "An instrument for rapidly measuring plasma distribution functions with high resolution," Adv. Space Res., 2(7):67-70, (1983).
D. J. McComas et al., "Solar Wind Electron Proton Alpha Monitor (SWEPAM) for the Advanced Composition Explorer," Space Science Reviews, 86:563-612, (1998).
D.J. Knudsen et al., "The CASSIOPE/e-POP Suprathermal Electron Imager (SEI)," Space Sci. Rev., 189:65-78, (2015).
D.J. McComas et al., "The Two Wide-angle Imaging Neutral-atom Spectrometers (TWINS) NASA Mission-of-Opportunity," Space Sci Rev, 142:157-231, (2009).
Danielle M. Wesolek et al., "A Micro-machined Flat Plasma Spectrometer (FlaPS)," Proc. SPIE 5344, MEMS/MOEMS Components and Their Applications, 5344:89-97, (2004).
David A. Dahl, "SIMION for the personal computer in reflection," International Journal of Mass Spectrometry, 200:3-25, (2000).
David T. Young, "Space plasma particle instrumentation and the new paradigm: Faster, cheaper, better," Measurement Techniques in Space Plasmas: Particles, Geophysical Monograph, 102:1-16, (1998).
E. A. MacDonald et al., "New Magnetospheric lon Composition Measurement Techniques," Future Perspectives of Space Plasma and Particle Instrumentation and International Collaborations, 1144:168-172, (2009).
Geoff McHarg et al., "USAFA Integrated Miniaturized Electrostatic Analyzer (iMESA)—an Undergraduate Space Weather Constellation," Space Weather, 13:827-830, (2015).
Glyn A. Collinson et al., "The geometric factor of electrostatic plasma analyzers: a case study from the Fast Plasma Investigation for the Magnetospheric Multiscale mission," Rev. Sci. Instrum., 83(3):033303, (2012).
H. Balsiger et al., "ROSINA—Rosetta Orbiter Spectrometer for Ion and Neutral Analysis," Space Science Reviews, 128:745-801, (2007).
H. D. Voss et al., "Medium Energy lon Mass and Neutral Atom Spectrometer," Journal of Spacecraft and Rockets, 29(4):566-569, (1992).
H. S. Feldmesser et al., "Canary: Ion Spectroscopy for lonospheric Sensing," Proc. SPIE, Space Missions and Technologies, 7691:76910K, (2010).
H. Zhao et al., "The evolution of ring current ion energy density and energy content during geomagnetic storms based on Van Allen Probes measurements," Journal of Geophysical Research: Space Physics, 120:7493-7511, (2015).
Herbert O. Funsten et al., "Limited Resource Plasma Analyzers: Miniaturization Concepts," Measurement Techniques in Space Plasmas: Particles, Geophysical Monograph, 102:157-167, (1998).
J. D. Sullivan, "Geomterical Factor and Directional Response of Single and Multi-Element Particle Telescopes," Nucl. Instr. and Methods, 95(5):5-11, (1971).
J. Gosling et al., "A Cookbook for Determining Essential Transmission Characteristics of Spherical Section Electrostatic Analyzers," Los Alamos National Laboratory Report, LA-10147- M, 163 pages, (1984).
J. Mattauch et al., "Über einen neuen Massenspektrographen," Z. Physik, 89:786-795, (1934).
J. Vallerga et al., "The FUV detector for the cosmic origins spectrograph on the Hubble Space Telescope," Nuclear Instruments and Methods in Physics Research, Section A, 477(1-3):551-555, (2002).
J.M. Stock et al., "Cross-delay-line microchannel plate detectors for the Spectrographic Imager on the IMAGE satellite," Proc. SPIE 3445, EUV, X-Ray, and Gamma-Ray Instrumentation for Astronomy IX, 3445:407-414, (1998).
K. J. Genestreti et al., "Temperature of the plasmasphere from Van Allen Probes HOPE," Journal of Geophysical Research: Space Physics, 122:310-323, (2017).
K. Torkar et al., "Active Spacecraft Potential Control Investigation," Space Sci. Rev., 199:515-544, (2016).
K. W. Ogilvie et al., "SWE, A Comprehensive Plasma Instrument for the Wind Spacecraft," Space Science Reviews, 71:55-77 (1995).
M. F. Thomsen et al., "Statistics of plasma fluxes at geosynchronous orbit over more than a full solar cycle," Space Weather, 5:S03004, (2007).
N. Singh et al., "Plasmasphere Refilling: Recent Observations and Modeling," Journal of Geophysical Rsearch, 97(A2):1049-1079, (Feb. 1, 1992).
NASA, "CubeSat Launch Initiative," https://www.nasa.gov/directorates/heo/home/CubeSats_ initiative, 4 pages, (2020). [Accessed Aug. 28, 2020].
O. H. W. Siegmund et al., "Microchannel plates for the UVCS and SUMER instruments on the SOHO satellite," Proc. SPIE 2518, EUV, X-Ray, and Gamma-Ray Instrumentation for Astronomy VI, 2518:344-355, (1995).
Oswald H. W. Siegmund et al., "High-resolution cross delay line detectors for the GALEX mission," Proc. SPIE 3765, EUV, X-Ray, and Gamma-Ray Instrumentation for Astronomy X, 3765:429-440, (1999).
Oswald H. W. Siegmund et al., "Performance of the double delay line microchannel plate detectors for the Far Ultraviolet Spectroscopic Explorer," Proc. SPIE 3114, EUV, X-Ray, and Gamma-Ray Instrumentation for Astronomy VIII, 7 pages, (1997).
Oswald H.W. Siegmund et al., "High resolution monolithic delay line readout techniques for two dimensional microchannel plate detectors," Proc SPIE 2006, EUV, X-Ray, and Gamma-Ray Instrumentation for Astronomy IV, 2006:176-187, (1993).
Oswald Siegmund et al., "High-performance microchannel plate imaging photon counters for spaceborne sensing," Proc SPIE 6220, Spaceborne Sensors III, 6220:622004, (2006).
P.A. Fernandes et al., "Low-Resource Technique for Measurement of H+ and O+ in the Terrestrial Magnetosphere," Journal of Geophysical Research: Space Physics, 124:9137-9153, (2019).
Plasma Controls, "ExB Probe Wien Velocity Filter," https://www.plasmacontrols.com/exb-velocity-filter.html, 3 pages (2020).
R. M. Skoug et al., "A wide field of view plasma spectrometer," J. Geophys. Res. Space Physics, 121:6590-6601, (2016).
S. J. Bame et al., "Diagnostics of space plasmas (invited)," Rev. Sci. Instrum., 57(8): 1711-1716, (Aug. 1986).
W. C. Feldman et al., "Long-Term Variations of Selected Solar Wind Properties: Imp 6, 7, and 8 Results," Journal of Geophysical Research, 83(A5):2177-2189, (May 1, 1978).
W. Reidler et al., "Active spacecraft potential control," Space. Sci. Rev., 79:271-302, (1997).

* cited by examiner

100

OFFICIAL USE ONLY/EXPORT CONTROLLED INFORMATION

OFFICIAL USE ONLY/EXPORT CONTROLLED INFORMATION

104

104

104

OFFICIAL USE ONLY/EXPORT CONTROLLED INFORMATION

OFFICIAL USE ONLY/EXPORT CONTROLLED INFORMATION

OFFICIAL USE ONLY/EXPORT CONTROLLED INFORMATION

ULTRA-COMPACT ION MASS SPECTROMETER FOR SPACE AND LABORATORY PLASMA MEASUREMENTS

CROSS-REFERENCE TO RELATED APPLICATIONS

This application claims the benefit of priority to U.S. Provisional Application Ser. No. 63/396,175, titled "ULTRA-COMPACT ION MASS SPECTROMETER FOR SPACE AND LABORATORY PLASMA MEASUREMENTS," filed Aug. 8, 2022, the contents of which are incorporated herein by reference in their entirety.

STATEMENT REGARDING GOVERNMENT SUPPORT

This invention was made with U.S. Government support under Agreement No. 80HQTR21T0062 awarded by the National Aeronautics and Space Administration (NASA) to Triad National Security, LLC. The government has certain rights in the invention.

BACKGROUND

The natural space environment and its effects on space systems present a host of challenges with respect to the design, development, and operation of satellites and spacecraft. One such area of issues is associated with space systems operating in plasma environments, which can lead to potentially hazardous levels of differential charging and cause interference for Global Positioning System (GPS) and communication signals.

Instrument design, for instruments to be used in space systems operating in plasma environments, has been guided by the philosophy of build to performance, however ever dwindling budgets and limited opportunities has revitalized the demand for low resource instruments that can yield relevant science return. Additionally, the space physics community has developed a growing interest in the benefits of cubesatellite (CubeSat), with their capability to provide spatial and temporal measurements at a much reduced cost.

Through applied effort, ingenuity, and innovation, many of these identified problems have been solved by developing solutions that are included in embodiments of the present disclosure, many examples of which are described in detail herein.

SUMMARY

Embodiments provide for a highly compact ion mass spectrometer capable of mass resolution for low-energy space plasma. Embodiments herein are capable of measuring flux, energy, and mass of ions providing unique measurements of the ionospheric outflow and cold plasma in the magnetosphere. Example ion mass spectrometers herein include a laminated collimator to define the field-of-view (FOV), a laminated electrostatic analyzer (ESA) to selectively filter ions based on energy-per-charge (E q), a magnetic sector analyzer to separate ions by mass-per-charge (M q), and a microchannel plate (MCP) with a position sensitive cross-delay anode (XDL) assembly to detect the location of the ions on the detector plane.

Example ion mass spectrometers herein are simple, compact, and robust instruments ideal for obtaining low-energy (0.1 eV to 1000 eV) ion composition measurements of ionospheric and cold magnetospheric space plasma. The instrument design has significant mass and volume savings when compared to existing ion mass spectrometers and has the additional advantage of being able to simultaneously measure multiple ion species signals of a given energy simultaneously, thus providing a true mass spectrum. The extremely low resource requirements of embodiments herein, in combination with the relaxed fabrication techniques and ease of assembly, allow for rapid and low-cost production.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Figure 1A:
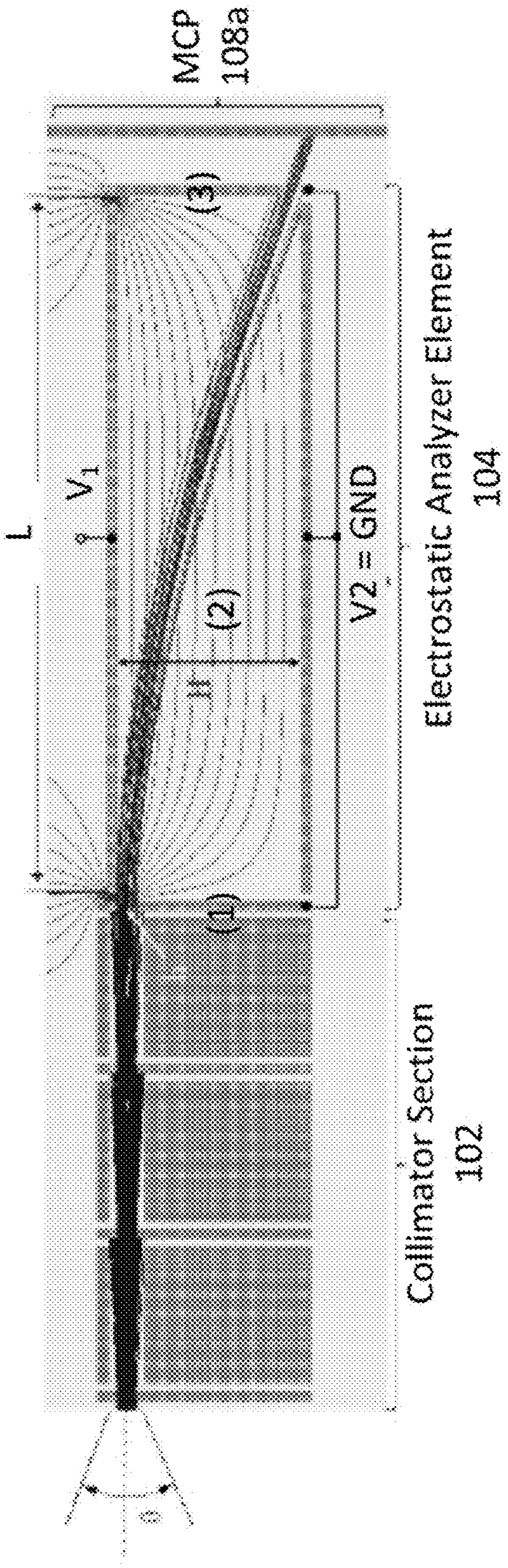
Figure 1B:
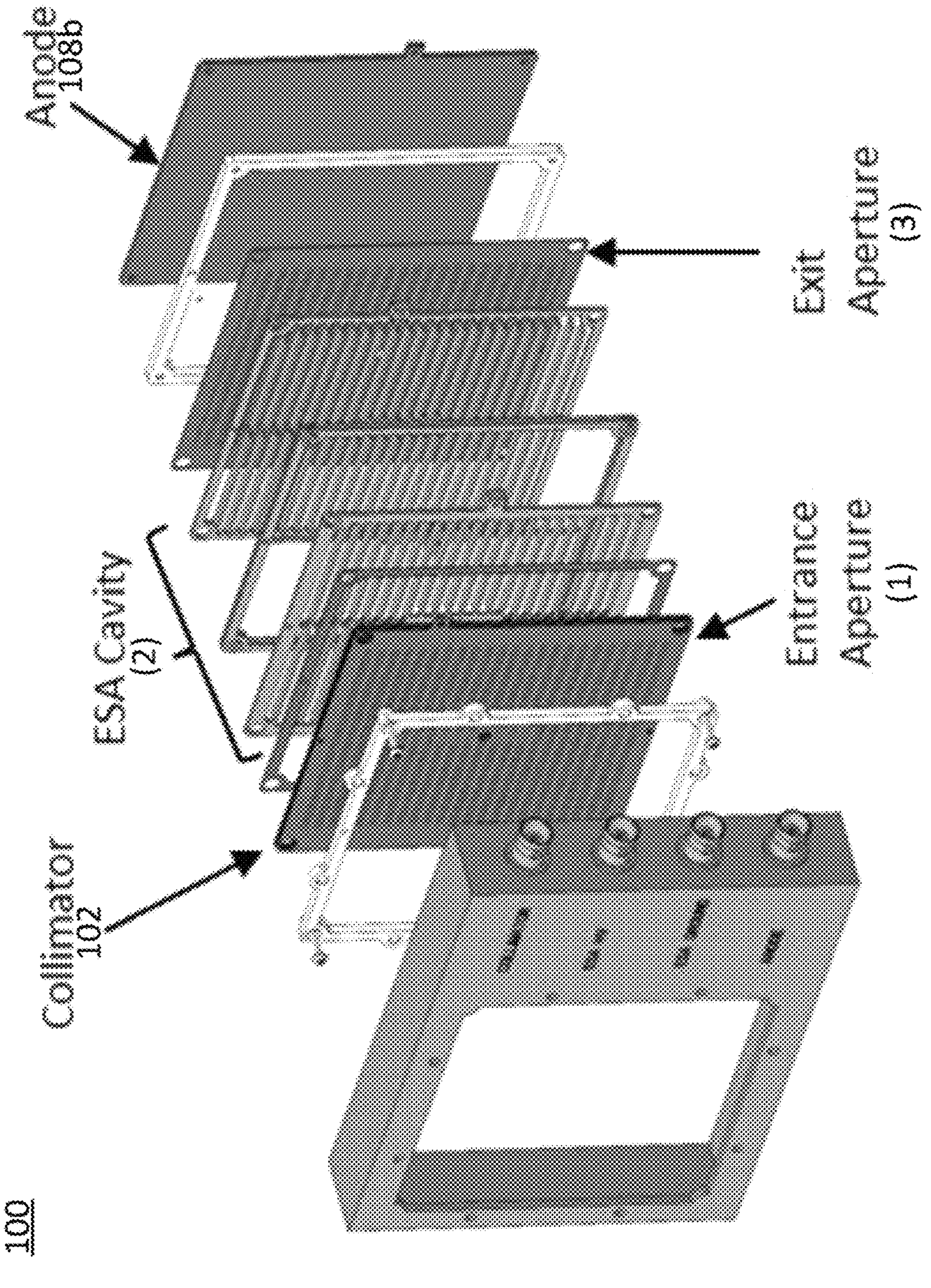

Having thus described the disclosure in general terms, reference will now be made to the accompanying drawings, which are not necessarily drawn to scale, and wherein:

FIGS. 1A and 1B depict an example ion mass spectrometer with a collimator section, in accordance with embodiments of the present disclosure.

Figure 2A:
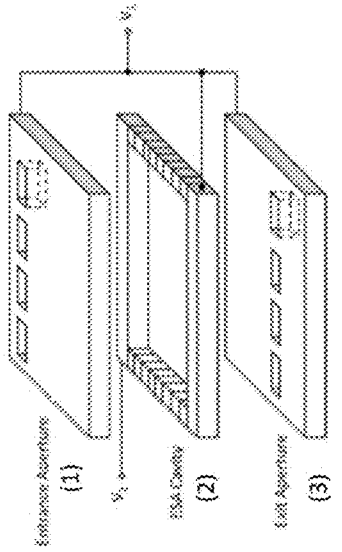

FIG. 2A depicts an example electrostatic energy bandpass filter, in accordance with embodiments of the present disclosure.

Figure 2B:
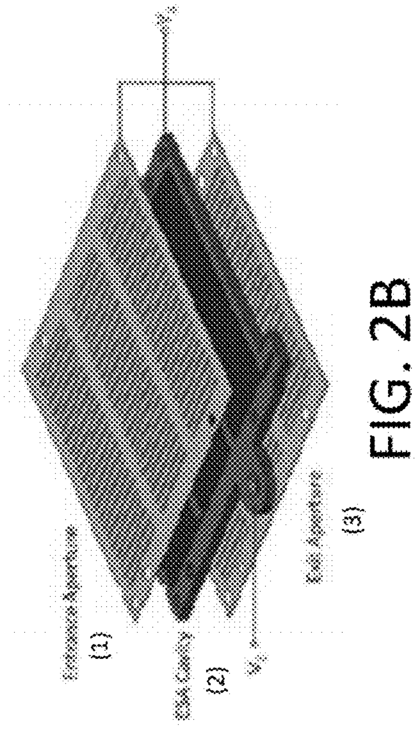

FIG. 2B depicts an example electrostatic energy bandpass filter, in accordance with embodiments of the present disclosure.

Figure 2C:
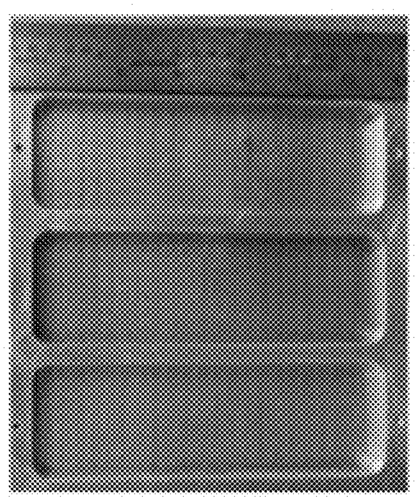

FIG. 2C depicts an example electrostatic energy bandpass filter, in accordance with embodiments of the present disclosure.

Figure 3:
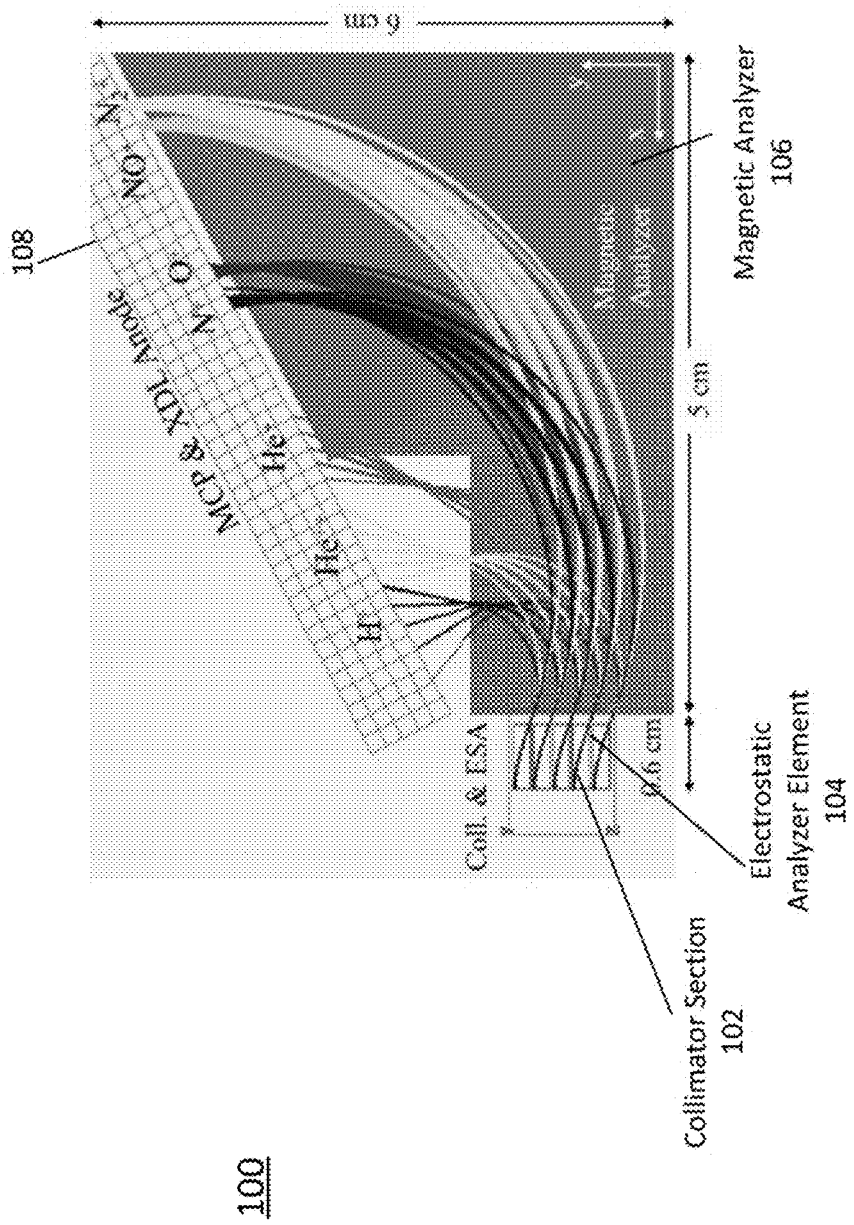

FIG. 3 depicts an example end-to-end simulation of an example ion mass spectrometer with a collimator section, in accordance with embodiments of the present disclosure.

Figure 4A:
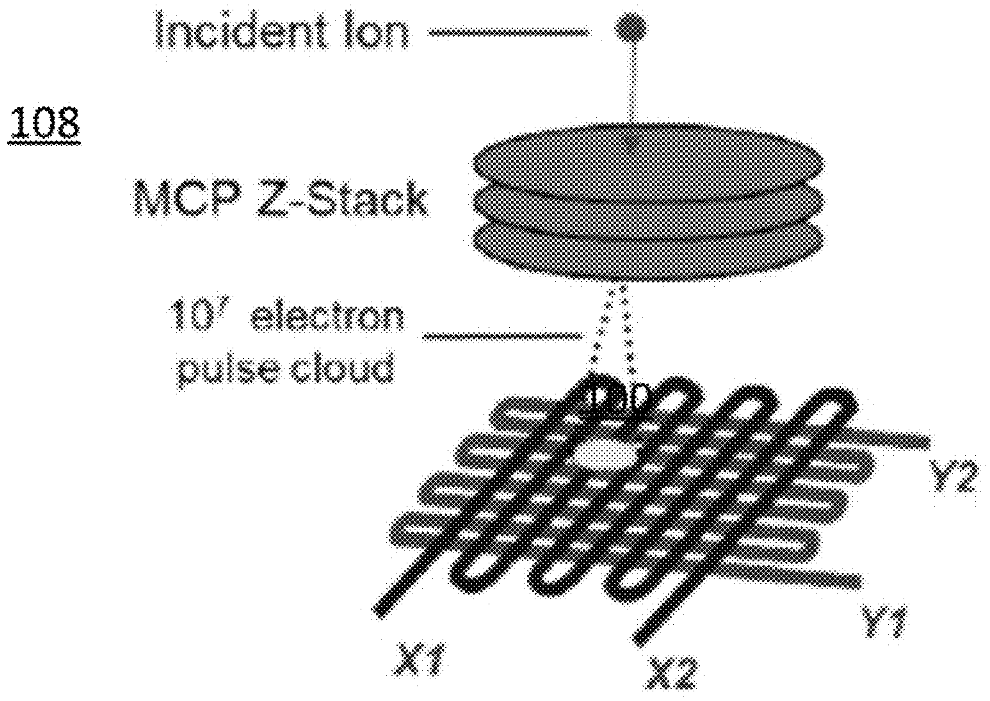
Figure 4B:
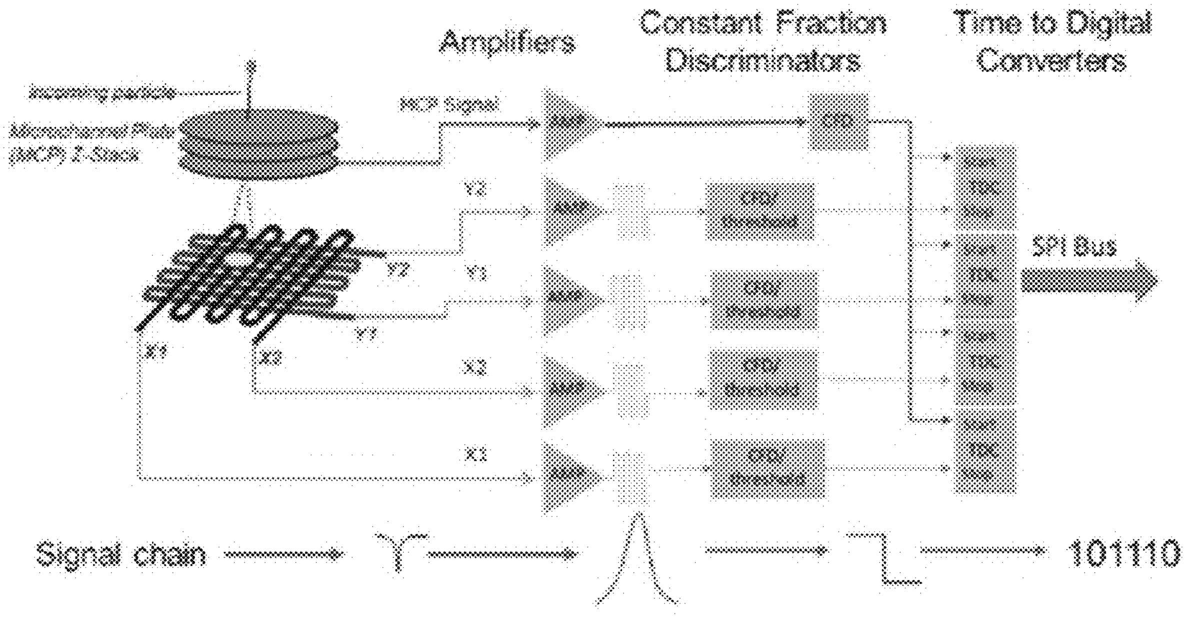

FIGS. 4A and 4B depict a functional schematic of an example position sensitive cross-delay anode (XDL) assembly, in accordance with embodiments of the present disclosure.

DETAILED DESCRIPTION

Various embodiments of the present disclosure now will be described more fully hereinafter with reference to the accompanying drawings, in which some, but not all embodiments of the disclosure are shown. Indeed, the disclosure may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout.

The natural space environment and its effects on space systems present a host of challenges with respect to the design, development, and operation of satellites and space craft. One such area of issues is associated with space systems operating in plasma environments, which can lead to potentially hazardous levels of differential charging and cause interference for GPS and communication signals.

Ion mass spectrometers have been an integral component of heliospheric and planetary missions since the dawn of the space age, providing critical observations regarding the plasma composition, sources, sinks, and acceleration mechanisms of the terrestrial ionosphere and magnetosphere. Two approaches used in space instrumentation to obtain ion composition measurements involve temporal or spatial methods.

Time-of-flight (TOF) ion mass spectrometers measure the time it takes for an ion of known energy to traverse a given length and utilize, for example, thin carbon foils to trigger timing electronics and linear-electric-fields (LEF) to achieve high mass resolution via time focusing. These observations require additional resources such as sophisticated timing electronics, long drift regions, and high voltage power supplies. While these instruments are exquisite in both design and capability, measurement sensitivity comes at a high-cost that excludes them from smaller missions operating under ever increasing fiscal constraints or for implementation as science payloads of large constellations required for ubiquitous multi-point space plasma measurements.

Quadrupole mass spectrometers (QMS) utilize radio frequency (RF) voltages to select a specific mass-per-charge (M q), and although these are also capable of good mass resolution, they are constrained by low duty cycles and considerable resource requirements.

Ion mass spectrometers utilizing magnetic analyzers separate ions spatially by altering their trajectories based on M q. This design offers advantages such as it does not require numerous static or sweeping voltages which entail additional power supplies and complex electronics, as do TOF and QMS ion mass spectrometers. Disadvantages of the magnetic sector analyzer include high mass requirements for the magnetic material needed to sufficiently bend ions with energy of tens of kiloelectronvolts (keV).

It is contemplated herein that providing charged particle distribution measurements to obtain energy, temperature, density, and resulting spacecraft-environment interaction effects in a multitude of environments would be advantageous and consistent with a desire for miniaturized instruments capable of providing salient data with minimal mass, volume, and power consumption requirements. The benefits of such measurements include an increased understanding of the physical phenomena and processes concerning heliophysics, solar wind flux, local space weather forecasting, spacecraft anomaly resolution, lunar surface plasma, and auroral regions where the complex interaction between the magnetic field lines, precipitating electrons, and upwelling ions create a dynamic charged particle environment.

Embodiments herein are directed to a low-resource ion mass spectrometer capable of measuring flux, energy, and mass of ions as a primary payload for micro-satellites, as an auxiliary payload on-board larger hosts, or in a unique configuration such as at the end of a boom, enable nearly ubiquitous measurements of the ionospheric outflow and cold plasma in the magnetosphere. Performing these measurements in the high-latitude region above 1000 km where ionospheric upflow becomes outflow, with the ability to resolve between protons ($H^+$) and higher mass ions ($O^+$, $He^+$, $He^{++}$, $N^+$, $N_2^+$, and $NO^+$) at low energies, provides the necessary initial conditions of the ion populations that drive magnetosphere-ionosphere coupling (MIC) along with magnetospheric composition and dynamics. Simultaneous in-situ measurements of the cold magnetospheric plasma composition in the reconnection region and magnetotail provide the final conditions for the outflowing ions and subsequent mass loading of the plasmasphere and magnetosphere. These data are critical to understanding MIC and are required to answer the long-standing questions regarding ionospheric outflow, the source of magnetospheric mass loading, and the subsequent impact on magnetic reconnection.

The extremely low resource requirements of instruments described herein in combination with the relaxed fabrication techniques and ease of assembly allows for rapid production of a number of sensors which can then be readily added as an auxiliary payload to any number of satellite platforms to obtain the necessary observations of low energy plasma from the ionosphere to the magnetosphere. A constellation of ion mass spectrometers according to embodiments herein providing in-situ low energy measurements of ionospheric outflow and cold magnetospheric plasma can answer long standing questions regarding the source of magnetospheric plasma, magnetosphere-ionosphere coupling, mass loading of the magnetosphere, magnetic reconnection, along with wave-particle interactions and solar wind entry in the magnetosphere.

Embodiments herein provide for a simple, compact, and robust instrument ideal for obtaining low energy (e.g., 0.1 electronvolt (eV) to 1000 eV) ion composition measurements of ionospheric and cold magnetospheric space plasma. Embodiments herein are designed such that significant mass and volume savings are achieved when compared to conventional ion mass spectrometers. Embodiments herein provide for further improvements over conventional ion mass spectrometers by simultaneously measuring multiple ion species signals of a given energy simultaneously, thus providing a true mass spectrum. Embodiments herein provide for ultrafast (e.g., 50-100 kHz) measurement of plasma ion concentration to provide new understanding of the physical processes that drive complex plasma dynamics in space.

Embodiments herein enable a low-resource (e.g., ultra-compact) ion mass spectrometer that is capable of measuring flux, energy, temperature, and spacecraft potential. The present ion mass spectrometer can measure charged particle fluxes at energies ranging from 0 to 1 kiloelectronvolts (keV).

The sensor head of embodiments herein has been successfully tested against a low energy magnetically filtered plasma source and an ion beam source capable of producing magnetic ions in the range of 100 electronvolts (eV) to 1200 eV. The present ion mass spectrometer has demonstrated the ability to accurately measure negative spacecraft frame charging using a low Earth orbit plasma simulator. The present ion mass spectrometer can be hosted as a primary payload for micro-satellites, as an auxiliary payload on-board larger hosts, or in a unique configuration such as at the end of a boom, providing for nearly real-time in-situ space plasma data.

Embodiments provide for a highly compact, low-resource, ion mass spectrometer capable of high-mass resolution for low-energy ionospheric and magnetospheric ions. Embodiments of the present ion mass spectrometer utilize a laminated analyzer design, leveraging geometry coupled with a transverse electric field to act as a band pass filter. As a result, embodiments herein allow only particles with a narrow range of energies around a specified energy, where that range is determined by the geometry of the device, to be recorded as signal (e.g. current or detected counts) by the ion mass spectrometer.

Embodiments of the present ion mass spectrometer include a sensor head composed of stacked conducting electrode layers with patterns of holes and slots machined in each layer (e.g., laser etched stainless steel laminated electrodes). The spectrometer utilizes a laminated collimator to define the FOV, a laminated electrostatic analyzer (ESA) to selectively filter ions based on energy-per-charge (E/q), a magnetic sensor analyzer to separate ions by mass-per-charge (M/q), and a microchannel plate (MCP) with a position sensitive cross-delay anode (XDL) assembly to detect the location of the ions on the detector plane.

The baffled collimator provides for improved energy and angle resolution. That is, the baffled collator section reduces scatter, prevents off-angle incident ions from entering the detector assembly, and prevents photons from enter the analyzer cavity and creating background counts on the MCP. Embodiments of the present sensor head include laser etched stainless steel (e.g., stainless steel sheets) and electro-discharge machined (EDM) aluminum, tungsten, or titanium. Utilizing laser etched stainless steel (e.g., stainless steel sheets) and EDM aluminum, tungsten, or titanium in the fabrication process of the present sensor results in a more robust mechanical design and significantly reduced cost as compared to designs that utilize etched silicon wafers. The design and manufacturing processes associated with the present sensor enable mass production of ruggedized and low-cost plasma spectrometers that can provide valuable data concerning the local space environment and resulting spacecraft charge. Embodiments herein enable spacecraft operators to diagnose anomalies and/or mitigate possible hazardous spacecraft charging events by powering down as the charge becomes potentially hazardous.

FIGS. 1A and 1B depicts an example ion mass spectrometer 100 with a collimator section 102, in accordance with embodiments of the present disclosure. In FIGS. 1A and 1B, the example ion mass spectrometer 100 is a double focusing mass spectrometer that utilizes electric and magnetic field geometries to focus in both direction and energy. With the use of this design, based on the geometry, multiple ion species are spatially distributed by M q along the focal plane and can be observed simultaneously as a true mass spectrum. The ion mass spectrometer 100 includes a collimator section 102 to define the FOV. The ion mass spectrometer 100 further includes a laminated electrostatic analyzer 104 (also referred to herein as an electrostatic analyzer element or ESA) to selectively filter ions by E q. The ion mass spectrometer 100 further includes a magnetic sector analyzer 106 to separate ions by M q. The ion mass spectrometer 100 further includes a micro-channel plate (MCP) followed by position sensitive cross delay anode (XDL) assembly 108 to detect the location of the ions on the detector plane. Magnetic analyzer 106 and MCP with XDL assembly 108 are depicted in FIG. 3.

The electrostatic analyzer element 104 (further depicted and described with respect to FIGS. 2A-2C) is based on a laminated design and is composed of three stacked conducting electrode layers with precise patterns of holes and slots machined in each layer to create a number of analyzer elements that consist of an entrance aperture (1), an ESA cavity (2), and an exit aperture (3).

FIGS. 2A-2C depict an example electrostatic energy bandpass filter, in accordance with embodiments of the present disclosure. In FIGS. 2A-2C, after exiting the collimator 102 (not shown in FIGS. 2A-C) the ions enter the electric field generated between the two parallel plates of the electrostatic analyzer cavity 104. The entrance aperture (1) and exit aperture (3) are rectangular slots with dimensions on the order of one to several hundred microns, where height, h, is the height of the entrance aperture (1). The slits are laser etched in stainless steel plates and define the analyzer FOV. The ESA cavities are created using an EDM technique to create the internal channels depicted as cavity region (2) in FIG. 1. The overall channel height and length are designated H and L, respectively. The electrostatic analyzer cavity is created using interlacing aluminum fingers such that the two segments biased to $V_1$ and $V_2$ are isolated from each other using thin insulating spacers and the anode is mounted downstream of the exit aperture, both of which are not shown for clarity. The ESA can use entrance and exit aperture plates populated with a total of 2025 individual analyzer elements with a total aperture area of 2.81 $cm^2$ created in approximately 38 $cm^2$ of detector surface using the laminated analyzer technique. The front face of the ESA 104 is shown in FIG. 2C.

The electric field is created by applying a bias to the discriminator plate, $V_1$, while holding the opposite plate, I'2, at the host vehicle ground. The combination of the applied electric field and analyzer geometry allow ions within a narrow range of a specified bandpass energy, $E/q=E_{set}$, to successfully travel through the entrance aperture, become deflected by the transverse electric field in the ESA cavity, and exit the cavity to enter the magnetic analyzer section as shown in FIG. 1. The analyzer geometry alone determines the range of E/q accepted. An analyzer constant called the plate factor, $P_f$, can be calculated from the physical dimensions of the ESA:

$$P_f = \frac{1}{4f}\left(\frac{L}{H}\right)^2 \quad (1)$$

where L is the length of the ESA, H is the center-to-center distance of the aperture openings, and f=H/(H+h), as shown in FIG. 1. An accurate knowledge of $P_f$ allows for determination of the incident charged particle energy through the relationship:

$$E=P_f V_{ESA} \quad (2)$$

where E is the streaming charged particle energy in eV and $V_{ESA}$ is the bias voltage in volts on the ESA. Of equal importance to the plate factor is the energy resolution, which is the ability of the sensor to distinguish between ions of similar energy. The physical dimensions of the ESA design dictate the ideal energy resolution as follows:

$$\left(\frac{\Delta E}{E}\right)_{FWHM} = \frac{4f(1-f)}{3f^2 = 2f - 1} \quad (3)$$

where $$\left(\frac{\Delta E}{E}\right)_{FWHM}$$

is the energy resolution at the FWHM. The specific physical dimensions of the ESA are L of 3500 microns, H of 850 microns, h of 100 microns, f of 0.882, $P_f$ of 7.06 and $$\left(\frac{\Delta E}{E}\right)_{FWHM}$$

Of 0.133. The energy resolution and plate factor can be adjusted to meet specific criteria through careful design of the physical parameters; however, the analytical values for these parameters require experimental characterization against a charged particle source. Deviations in the physical sensor head due to machining, as well as mechanical tolerances, can lead to discrepancies between the analytical design and operational instrument response. The current plate factor for the ESA design preferably includes a 150 V power supply to measure the ion energies of interest (<1 keV).

Functionality of embodiments herein, depicted in FIG. 3, was modeled using the SIMION software package using ion species relevant to ionospheric outflow and magnetic reconnection ($H^+$, $He^+$, $He^{++}$, $O^+$, $N^+$, $NO^+$, $N_2^+$) to demonstrate the feasibility of the design. The results for ion species separation based on mass and charge state provide confidence that the ion mass spectrometer 100 has the potential to make critical measurements of the ionospheric outflow and cold magnetospheric ion populations in terms of species, energy, and flux. The simulations demonstrate high-mass resolution at 10 eV between $N^+$ and $O^+$ with M/ΔM=8 while the clear distinction between $NO^+$ and $N_2^+$ demonstrates M/ΔM=15. At higher energies the detection locations can increase which may drive the requirements regarding MCP/XDL anode size and limit the maximum energy range. It will be appreciated that the low mass and volume resource characteristics of the ion mass spectrometer (e.g., 100) allow for the potential of the sensor being placed on a boom to reduce the impact of the spacecraft sheath on the plasma.

The magnetic analyzer section 106, created utilizing permanent magnets, is positioned downstream of the electrostatic analyzer 104 to separate ions based on momentum-to-charge, M/q. The low energy range of the ion mass spectrometer (e.g., 100) results in a reduced magnetic field strength requirement and therefore less magnetic material thus maintaining a low resource instrument profile. Ions exit the electrostatic analyzer section 104 within a narrow range of the selected bandpass energy, enter the magnetic analyzer section 106, and ion trajectories will subsequently diverge based on M q such that high-mass ions will be deflected less than lighter species such as $H^+$.

An example design of the magnetic analyzer shape has been created in SIMION using several "pixels" that are parallel square magnetic poles with the field line pointing into the image (z-axis) as shown in FIG. 1. The magnetic sector field strength will be optimized to focus high mass ions (16 amu) onto the detector plane thus providing the best mass resolution possible in an effort to resolve between $N^+$ and $O^+$ across the entire energy range of the instrument. A notch in the magnetic analyzer sector, where the low mass ions ($H^+$, $He^+$, $He^{++}$) will pass through, balances between the need for a higher strength magnetic field required to focus the high mass ions and over-deflection of the low mass ions. A radius may be created at the outer most edge rather than a straight edged section. This radius will be defined by the trajectory of the heaviest ion with the highest energy to be measured by the ion mass spectrometer (e.g., 100). Removing the unnecessary magnetic material will provide further mass reduction. The magnetic sector may be created using samarium cobalt or neodymium boron iron magnets depending on temperature requirements and will be fabricated according to the physical dimensions and field strength requirements.

FIGS. 4A and 4B depict a functional schematic of an example position sensitive cross-delay anode (XDL) assembly 108, in accordance with embodiments of the present disclosure. FIG. 4B further depicts a functional schematic of the electronics for use with the example assembly 108. The location of the ions incident on the detector plane will be observed using an MCP stack followed by an XDL anode 108. Plasma spectrometer detectors typically require a particle count rate maximum of $10^5$ $s^{-1}$ and detector speed <100 ns per event to prevent pulse pile-up. The XDL sensors operate at a specified detection rate of >$10^6$ $s^{-1}$ with timing accuracy of 0.1 ns FWHM and spatial resolution of 35 μm FWHM. These parameters have been identified as more than sufficient for plasma spectrometers. The XDL sensors have an established history of use in space-based instruments for photon detection.

In embodiments herein, an XDL assembly 108 consists of an MCP detector 108*a* in a z-stack (3 plate) configuration followed by a cross delay-line anode 108*b*. An incident ion strikes the front of the MCP detector and generates a secondary electron avalanche, resulting in a gain of ~$10^7$, which exits the MCP 108*a* depositing the resulting charge on the anode 108*b*. The XDL anode 108*b* is formed by two orthogonal serpentine conductors and the position of the charge pulse is then determined by the difference in arrival time of the pulse at the ends resistive-capacitance delay lines.

The XDL electronics consist of a high gain-bandwidth product operational amplifiers and fast comparators configured in a constant fraction discriminator (CFD) topology at the end of each delay line. This circuit amplifies the pulses from the XDL and translates the analog pulse to a digital signal to drive the start and stop inputs on the time-to-digital converter (TDC) integrated circuits. The advantage of utilizing CFD topology is to negate the effects of conventional threshold triggering which inherently introduces errors in timing measurements between analog input pulses of varying amplitudes. The CFD circuit behaves as an amplitude-invariant mechanism to drive the TDCs. The resolution of the assembly can be determined by the event timing error which is dominated by the CFD performance.

An initial XDL sensor with dimensions of 94 mm×94 mm has been selected for embodiments herein with the majority of the electronics work being dedicated to design and optimization of the supporting electronics. This includes selection of necessary amplifiers, CFDs, TACs, board design, layout, and testing. A field-programmable-gate array (FPGA) will interface the TDCs through a SPI interface to record the start-stop events to translate to precision spatial resolution. Depending on the prototype electronics' subsequent position and time resolution, design simplification will occur to further decrease the required cost and power resources for future flight opportunities of the embodiments herein.

The estimated resources for embodiments herein for a flight (including MCP and XDL electronics and power supplies) are approximately 5 kg, 4.8 W, and 1000 $cm^3$.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed is:

1. An ion mass spectrometer, comprising:

a laminated collimator;

a laminated electrostatic analyzer (ESA) positioned downstream from the laminated collimator;

a magnetic sector analyzer positioned downstream from the laminated electrostatic analyzer (ESA); and a position sensitive cross-delay anode (XDL) assembly comprising a micro-channel plate (MCP) and a cross delay-line (XDL) anode.

2. The ion mass spectrometer of claim 1, wherein ions pass through the laminated collimator and enter an electric field generated between two parallel plates of an entrance aperture of the laminated electrostatic analyzer (ESA).

3. The ion mass spectrometer of claim 2, wherein the entrance aperture is a rectangular slot having dimensions of one to several hundred microns.

4. The ion mass spectrometer of claim 2, wherein the laminated electrostatic analyzer (ESA) comprises three stacked conducting electrode layers.

5. The ion mass spectrometer of claim 4, wherein the three stacked conducting electrode layers comprise precise patterns of holes and slots machined in each layer to create a number of analyzer elements.

6. The ion mass spectrometer of claim 2, wherein the laminated electrostatic analyzer (ESA) comprises interlacing aluminum fingers such that the two parallel plates are biased to $V_1$ and $V_2$ and are isolated from each other using thin insulating spacers.

7. The ion mass spectrometer of claim 2, further comprising an exit aperture downstream from the two parallel plates and an anode mounted downstream of the exit aperture.

8. The ion mass spectrometer of claim 1, wherein the laminated collimator is configured to define a field-of-view (FOV) of the ion mass spectrometer.

9. The ion mass spectrometer of claim 1, wherein the laminated collimator is configured to prevent off-angle incident ions from entering the laminated electrostatic analyzer (ESA), to prevent photons from enter the magnetic sector analyzer, and to prevent creating background counts at the position sensitive cross-delay anode (XDL) assembly.

10. The ion mass spectrometer of claim 1, wherein the laminated electrostatic analyzer (ESA) is configured to selectively filter ions based on an energy-per-charge (E/q).

11. The ion mass spectrometer of claim 1, wherein the magnetic sector analyzer is configured to separate ions based on a mass-per-charge (M/q).

12. The ion mass spectrometer of claim 11, wherein the magnetic sector analyzer comprises permanent magnets.

13. The ion mass spectrometer of claim 1, wherein the position sensitive cross-delay anode (XDL) assembly is configured to detect a location of ions on a detector plane.

14. The ion mass spectrometer of claim 1, wherein the micro-channel plate (MCP) is configured in a z-stack (3 plate) configuration.

15. The ion mass spectrometer of claim 1, wherein the position sensitive cross-delay anode (XDL) assembly further comprises electronics comprising high gain-bandwidth product operational amplifiers and fast comparators configured in a constant fraction discriminator (CFD) topology at an end of each delay line.

16. The ion mass spectrometer of claim 15, wherein the electronics amplify pulses from the crosss delay-line (XDL) anode and translates the pulses to a digital signal to drive start and stop inputs on time-to-digital converter (TDC) integrated circuits.

17. The ion mass spectrometer of claim 1, wherein the cross delay-line (XDL) anode is formed by two orthogonal serpentine conductors and a position of a charge pulse is determined by a difference in arrival time of the charge pulse at ends of resistive-capacitance delay lines of the two orthogonal serpentine conductors.

18. The ion mass spectrometer of claim 1, wherein the ion mass spectrometer comprises a mass of less than 5 kilograms (kg).

19. The ion mass spectrometer of claim 1, wherein the ion mass spectrometer comprises a power draw of less than 5 Watts (W).

20. The ion mass spectrometer of claim 1, wherein the ion mass spectrometer comprises a volume of less than 1000 $cm^3$.

21. The ion mass spectrometer of claim 1, wherein the ion mass spectrometer comprises an energy range of up to 5 kiloelectronvolts (keV).

22. The ion mass spectrometer of claim 1, further comprising a power supply.

23. The ion mass spectrometer of claim 22, wherein the power supply is rated at 150 volts (V).

24. The ion mass spectrometer of claim 1, wherein the ion mass spectrometer comprises an energy resolution of 29%.

25. The ion mass spectrometer of claim 1, wherein the ion mass spectrometer comprises a geometric factor of $1.97\times10^{-5}$ sr $cm^2$ eV/eV.

26. The ion mass spectrometer of claim 1, wherein the laminated collimator comprises a plurality of stainless-steel plates each having a plurality of openings etched therein.

* * * * *